United States Patent
Ogasawara et al.

[11] Patent Number: 5,990,445
[45] Date of Patent: Nov. 23, 1999

[54] CONSUMABLE ELECTRODE TYPE AC PULSE ARC WELDING APPARATUS

[76] Inventors: Takaaki Ogasawara; Masaru Tabata; Masahiro Homma; Eiji Sato, all of c/o Toyohashi Plant in Kobe Steel, Ltd. 1-2 Azanakahara, Mitsuya-cho, Toyohashi-shi, Aichi, 441-3114, Japan

[21] Appl. No.: 09/056,087

[22] Filed: Apr. 7, 1998

[30] Foreign Application Priority Data

Apr. 11, 1997 [JP] Japan .................................. 9-094153

[51] Int. Cl.$^6$ .................................................. B23K 9/09
[52] U.S. Cl. ................................. 219/130.5; 219/130.51
[58] Field of Search ..................... 219/130.51, 130.21, 219/130.31, 130.32, 130.33, 130.5, 137 PS

[56] References Cited

U.S. PATENT DOCUMENTS

| | | | |
|---|---|---|---|
| 4,608,482 | 8/1986 | Cox et al. ........................... | 219/130.31 |
| 4,876,433 | 10/1989 | Kashima et al. .................... | 219/130.51 |
| 5,017,757 | 5/1991 | Kawai et al. ....................... | 219/130.51 |
| 5,220,151 | 6/1993 | Terayama et al. .................. | 219/130.51 |
| 5,349,159 | 9/1994 | Mita et al. .......................... | 219/130.51 |

FOREIGN PATENT DOCUMENTS

1-186279  7/1989  Japan ................................ 219/130.51

*Primary Examiner*—Clifford C. Shaw

[57] ABSTRACT

The consumable electrode type AC pulse arc welding apparatus is configured so that the pulse width setting circuit 16 includes the pulse width setting device 16*a* for hard wire, the pulse width setting device 16*b* for soft wire and the switch SW2 for switching the pulse width setting device. Further, the frequency setting device 20 includes the frequency setting device 20*a* for hard wire, the frequency setting device 20*b* for soft wire and the switch SW3 for switching the frequency setting device. By switching the switch SW1 when switching wire type, within the pulse width setting devices and the frequency setting devices, the selection between the hard wire side and the soft wire side can be simultaneously switched, thereby welding can be implemented with a suitable welding condition according to the wire type.

8 Claims, 5 Drawing Sheets

CONSUMABLE ELECTRODE TYPE AC PULSE ARC WELDING APPARATUS

BACKGROUND OF THE INVENTION

1. Field of the Invention

The present invention relates to a consumable electrode type AC pulse arc welding apparatus which uses a wire of an aluminium or an aluminium alloy, and more particularly to a consumable electrode type AC pulse arc welding apparatus, which is constituted of a simple circuit, and by which an excellent bead appearance and welding workability can be obtained, even if using the wires of different materials.

2. Description of the Related Art

A consumable electrode type AC pulse arc welding is a method of welding a workpiece by alternately feeding a straight polarity welding current and a reverse polarity pulse welding current so as to generate an arc between the arc and the workpiece while feeding a wire toward the workpiece with a preset rate. At a time of this consumable electrode type pulse arc welding, when the straight polarity welding current is being applied to the wire, i.e., when the wire is in a minus energize period (hereinafter, referred to as a straight polarity arc period), a droplet is formed at a wire tip. On the other hand, when the reverse polarity pulse welding current is being applied to the wire, i.e., when the wire is in a plus energized period (hereinafter, referred to as a reverse polarity period), a pulse current is being applied to the wire, the droplet formed at the wire tip transfers to the workpiece.

In such consumable electrode type pulse arc welding, when welding the workpiece made of an aluminium or an aluminium alloy, the most suitable condition would be different, in accordance with a material of a wire to be used. Therefore, for instance, in case of conducting a welding by using a wire (hard family) made of an aluminium alloy of No. 5000 family which is mainly used in Japan, a welding apparatus suitable for this wire is selected, thereby, an excellent welding can be implemented.

However, when applying a wire (soft family) made of an aluminium of, for example, No. 1000 family, to the welding apparatus by which an excellent welding can be implemented when the wire made of an aluminium alloy of No. 5000 family is used, the following problems would occur. That is, because of an increasing occurrence amount of sputter, the appearance of the beads could be damaged. Also, as the concentration of the arc is reduced, the welding workability possibly becomes worse. These problems are mainly caused by changing the molten temperature thereof, because of the differing materials of wires.

As described above, in a conventional welding apparatus having a single circuit configuration, it can not be applied effectively for wires of different materials. Further, such problem of which a circuit within a welding apparatus could be complicated by configuring a double circuit for the wires of each materials will occur.

SUMMARY OF THE INVENTION

Accordingly, it is an object of the present invention to provide a consumable electrode type AC pulse arc welding apparatus capable of being applied to the wires of different materials with a simple circuit configuration, and capable of obtaining excellent bead appearance and workability, even when using any type of wires.

A consumable electrode type AC pulse arc welding apparatus according to the present invention, in the consumable electrode type AC pulse arc welding apparatus for alternately supplying a reverse polarity arc current constituted of a base current for maintaining an arc and a pulse current for transferring a droplet to a workpiece, and a straight polarity arc current to which a current value is set based on the wire feed rate, with a predetermined frequency, to a wire, includes:

a pulse width setting device for a first wire and a pulse width setting device for a second wire for setting widths of pulse currents of reverse polarity arc currents;

a pulse frequency setting device for a first wire and a pulse frequency setting device for a second wire for setting said frequencies; and switching means for simultaneously switching a selection of said pulse width setting device for a first wire and said pulse width setting device for a second wire and a selection of said pulse frequency setting device for a first wire and said pulse frequency setting device for a second wire.

In the present invention, in accordance with the material of wire, a pulse width setting device for a first wire or a pulse width setting device for a second wire is selected, and a pulse width suitable for the first wire or the second wire is selected within these setting devices, thereby a trimming of a supply amount of energy to the wire can be made possible, and a transfer of one droplet to the workpiece by one pulse can be implemented.

Further, in the present invention, in accordance with the material of wire, a frequency setting device for a hard wire or a frequency setting device for a soft wire is selected, and a frequency suitable for the first wire or the second wire is selected within these setting devices, thereby an average value of current can be changed. Accordingly, in accordance with a material of a wire, an energy supply amount to the wire can be changed largely, thereby a molten amount of the workpiece can be adjusted properly.

Also, the consumable electrode type AC pulse arc welding apparatus according to the present invention preferably includes:

a polarity ratio setting device for adjusting frequency setting values of said pulse frequency setting device for a first wire and said pulse frequency setting device for a second wire, as well as for determining a straight polarity arc period $T_{EN}$, such that a polarity ratio $\gamma = (I_{EN} \times T_{EN})/(I_P \times T_P + I_{EN} \times T_{EN})$ would turn to a predetermined value, as setting a base current of said reverse polarity arc being $I_B$, a period being $T_B$, a pulse current $I_P$, a pulse width $T_P$, said straight polarity arc current being $I_{EN}$, and a period being $T_{EN}$.

Further, the consumable electrode type AC pulse arc welding apparatus according to the present invention preferably includes:

a ratio gain for changing a straight polarity arc period $T_{EN}$ such that a ratio $T_P/T_{EN}$ of a pulse width $T_P$ and a straight polarity arc period $T_{EN}$ turns to be a constant when switching a selection of said pulse width setting device for a first wire and said pulse width setting device for a second wire and a selection of said pulse frequency setting device for a first wire and said pulse frequency setting device for a second wire.

As described above, if the welding apparatus according to the present invention has the ratio gain, even if the pulse width $T_P$ is changed when switching a selection by the switching means, because the $T_{EN}$ is so adjusted that the $T_P/T_{EN}$ would turn to be a constant by the ratio gain, the polarity ratio $\gamma$ turns to be a constant. Therefore, because a welding penetration depth would be equal comparing with that before switching, a finish of welding can be predicted, thereby a welding workability can be enhanced much more.

Accordingly, disregarding the material of the wire, an excellent bead appearance and welding workability can be obtained, with a simple circuit configuration.

BRIEF DESCRIPTION OF THE DRAWINGS

FIGS. 2 (a)–(c) are waveform diagrams showing the examples of AC pulses of the welding currents;

DESCRIPTION OF THE PREFERRED EMBODIMENTS

Figure 1:
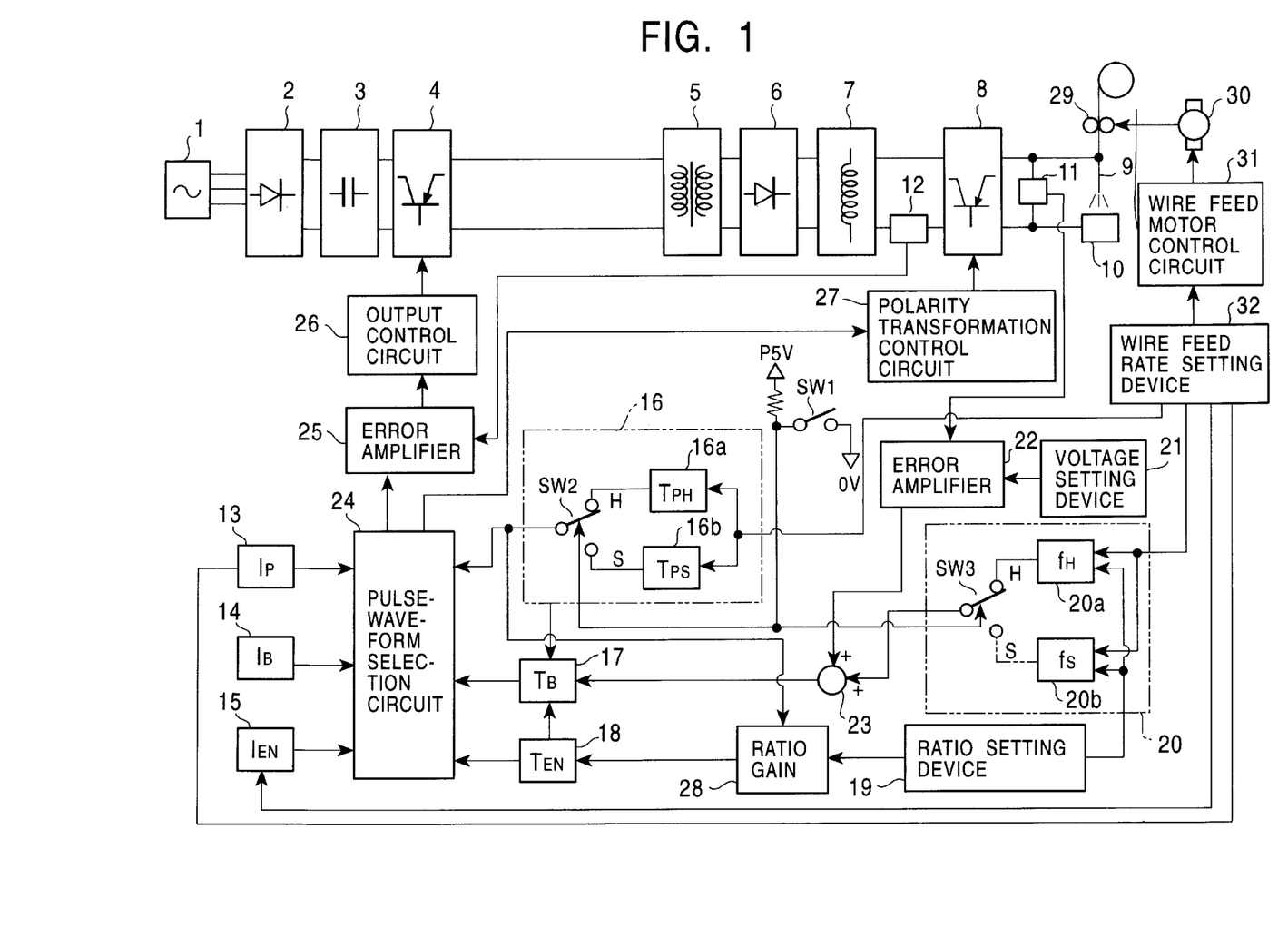
FIG. 1 is a block diagram showing a consumable electrode type AC pulse arc welding apparatus according to the first embodiment of the present invention.

With reference to the accompanying drawings, the preferred embodiments of the consumable electrode type AC pulse arc welding apparatus according to the present invention will be described concretely in detail. FIG. 1 is a block diagram showing a consumable electrode type AC pulse arc welding apparatus according to the first embodiment of the present invention. Further, FIGS. 2 (a)–(c) are waveform diagrams showing examples of the AC pulses of the welding currents.

At first, a power unit for feeding welding power will be described. An AC current supplied from a three-phase AC power supply unit 1 is rectified to a DC current by a first rectifying unit 2, and is smoothed by a smoothing capacitor 3. A primary inverter 4 converts this current to a high frequency AC current. A down transformer 5 step-down converts an output of the primary converter 4 to a voltage for welding. A second rectifying unit 6 rectifies the high frequency AC current output from the down transformer 5. This DC current is smoothed by a reactor 7 and is polarity-converted by the secondary inverter 8, and is fed between the wire 9 and the workpiece 10 as an AC current of low frequency, thereby a welding is implemented.

Further, a voltage detector 11 is connected between the output terminals of the secondary inverter 8, and detects a welding voltage between the wire 9 and the workpiece 10 at the time of welding. Also, a current detector 12 is linked between the reactor 7 and the secondary inverter 8, and detects a value of welding current. The outputs of these voltage detector 11 and the current detector 12 are both provided to a control circuit which will be described later.

The wire 9 is fed with a predetermined rate toward the workpiece 10 by a wire feed roller 29 which is driven by a wire feed motor 30, and generates an arc between the wire 9 and the workpiece 10, thereby a welding is implemented. In this case, the wire feed motor control circuit 31 controls a rotational speed of the wire feed motor 30 based on a setting signal from the wire feed rate setting device 32.

Figure 2A:
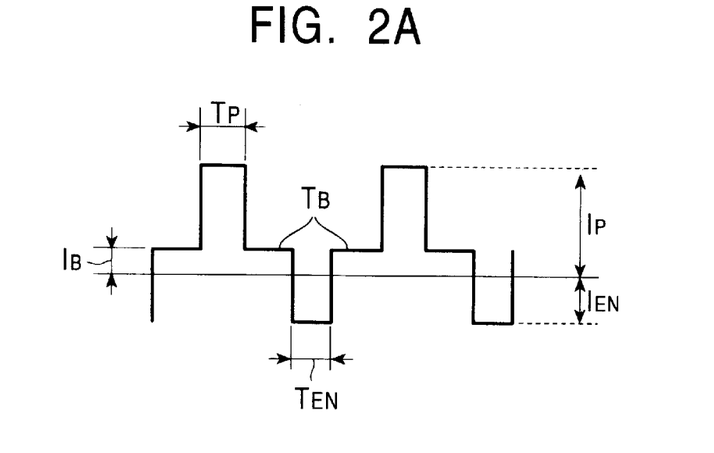
Figure 2B:
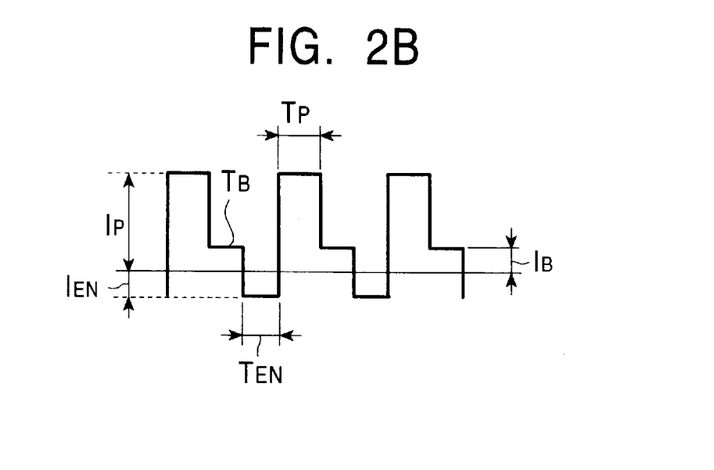
Figure 2C:
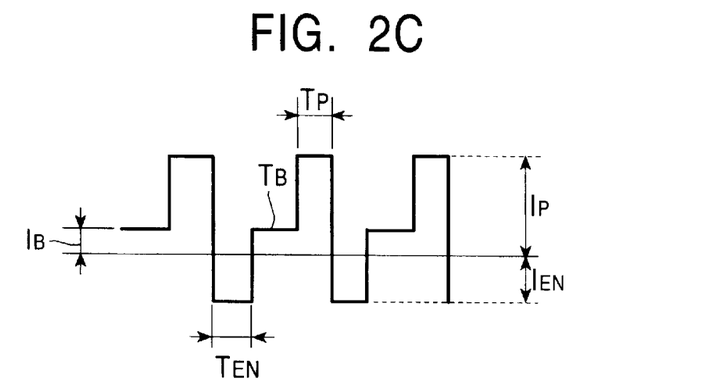

The control circuit controls the primary inverter 4 and the secondary inverter 8, based on the outputs from the voltage detector 11 and the current detector 12, and for example, as shown in FIGS. 2 (a)–(c), forms an AC pulse constituted of a base current period $T_B$ for supplying a base current $I_B$, pulse widths (pulse current periods) $T_{PH}$, $T_{PS}$ for supplying a pulse current $I_P$, and a straight polarity arc period $T_{EN}$ for supplying a straight polarity current $I_{EN}$. In this case, a frequency $f_H$ of an AC pulse in case of using the hard wire is expressed by $f_H=1/T=1/(T_{PH}+T_B+T_{EN})$, and a frequency $f_s$ of an AC pulse in case of using the soft wire is expressed by $f_s=1/T=1/(T_{PS}+T_B+T_{EN})$.

Next, a configuration of the control circuit will be described. A pulse width setting circuit 16 has a pulse width setting device 16a for the hard wire (for the first wire), a pulse width setting device 16b for the soft wire (for the second wire) and a switch SW2 for switching a pulse width setting device. Therefore, depending on a kind of wire to be used, by switching the pulse width setting device switch SW2 to the hard wire side (H) or the soft wire side (s), it is configured to select a pulse width setting device to be connected to the circuit.

Figure 3:
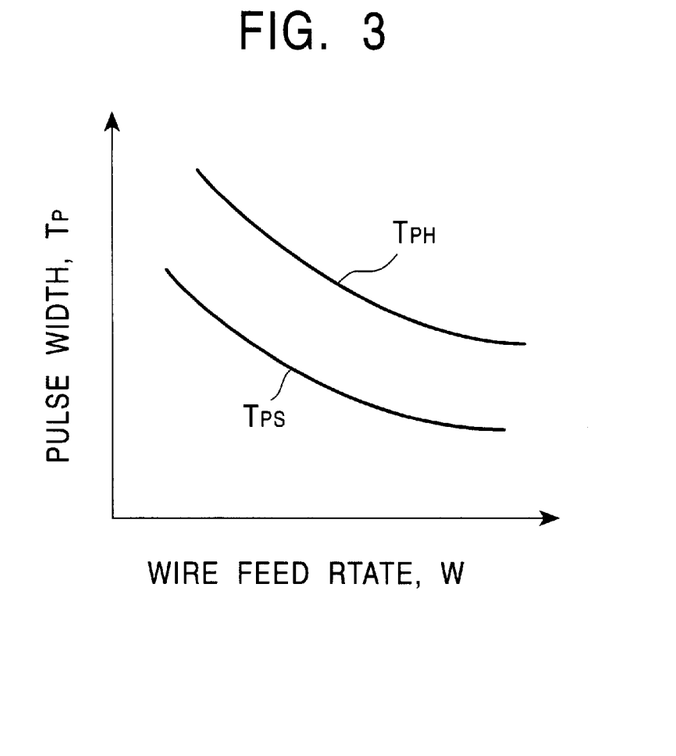
FIG. 3 is a graph showing pulse widths $T_{PH}$, $T_{PS}$ which are set by the wire feed rates at the time when using the hard wire or the soft wire, with as the pulse width as the ordinate, an the wire feed rate as the abscissa.

In each of the pulse width setting devices 16a and 16b, for example, as shown in FIG. 3, the pulse width $T_{PH}$ for the hard wire and the pulse width $T_{PS}$ for the soft wire are respectively set corresponding to the wire feed rate W. Accordingly, when a signal from the wire feed rate setting device 32 is input to the pulse width setting device 16, corresponding to the material of the wire (the hard wire or the soft wire), a pulse width suitable for the wire feed rate is set, and the pulse width setting devices 16a and 16b output these setting values to the pulse waveform selection circuit 24.

The frequency setting circuit 20 has a frequency setting device 20a for the hard wire, a frequency setting device 20b for the soft wire and a switch SW3 for switching a frequency setting device. Accordingly, depending on the kind of wire to be used, by switching the switch SW3 for switching a frequency setting device to the hard wire side (H) or the soft wire side (S), it is configured to enable selecting a frequency setting device to be connected to the circuit.

The switch SW2 for switching the pulse width setting device and the switch SW3 for switching the frequency setting device are so connected that they are simultaneously switched by the switch SW1 (switching means) for switching the wire type. That is, when the switch SW1 for switching a wire kind is open, a signal of 1 is output, from the power supply voltage P5V, to the switch SW2 for switching a pulse width setting device and the switch SW3 for switching a frequency setting device. As a result, the switch SW2 for switching a pulse width setting device and the switch SW3 for switching a frequency setting device select the hard wire side (H) by the signal of 1.

On the other hand, when the switch SW1 for switching a wire kind is closed, a current from the power supply voltage P5V is grounded, and a signal of 0 is output to the switch SW2 for switching a pulse width setting device and the switch SW3 for switching a frequency setting device. As a result, the switch SW2 for switching a pulse width setting device and the switch SW3 for switching a frequency setting device select the soft wire side (S) by the signal of 0. As described above, by switching the switch SW1 for switching the wire type, in accordance with the type of wire to be used, the switch SW2 for switching a pulse width setting device and the switch SW3 for switching a frequency setting device can be switched simultaneously to the hard wire side or the soft wire side.

Figure 4:
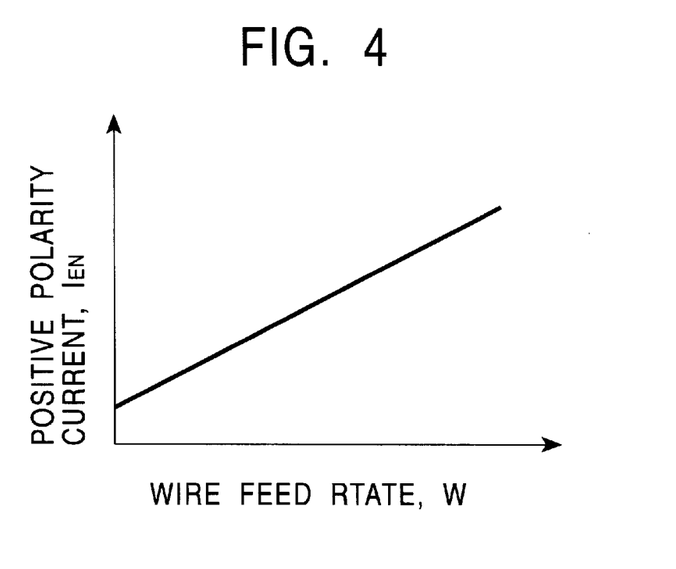
FIG. 4 is a graph showing a straight polarity current $I_{EN}$ to be set by a wire feed rate, with the a straight polarity current as the ordinate and the wire feed rate as the abscissa.
Figure 5:
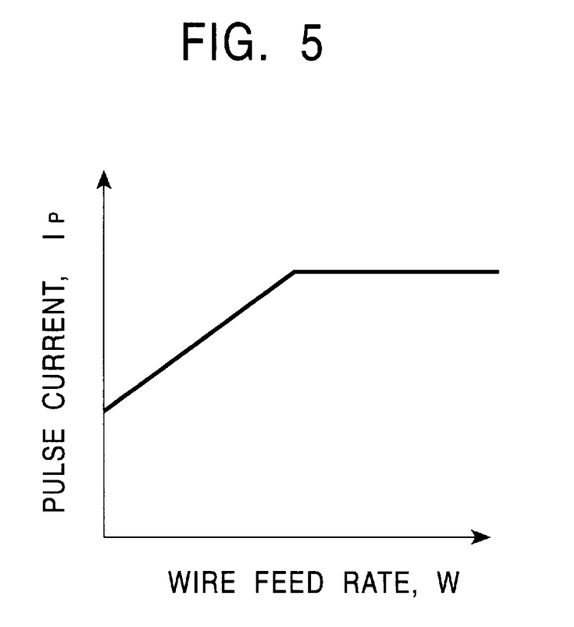
FIG. 5 is a graph showing a pulse current $_P$, to be set by a wire feed rate, with the a pulse current as the ordinate, and the wire feed rate as the abscissa.

Further, in the base current setting circuit 14, a current value $I_B$ which is required to maintain an arc is being set. The base current setting circuit 14 outputs this setting value to the pulse waveform selection circuit 24. In the straight polarity current setting circuit 15, for example, as shown in FIG. 4, a straight polarity current $I_{EN}$ is set corresponding to a wire feed rate W. This relationship is common to the kinds of wire. The straight polarity current setting circuit 15 outputs this setting value to the pulse waveform selection circuit 24. Also, as shown in FIG. 5, about the pulse current setting circuit 13, a pulse current $I_P$, is set corresponding to a wire feed rate W. This relationship is common to the kinds of wire. The pulse current setting circuit 13 outputs this setting value to the pulse waveform selection circuit 24.

A polarity ratio setting device 19 sets a ratio (polarity ratio γ) of an energizing amount of a straight polarity arc with respect to an overall energizing amount. The polarity ratio setting device 19 outputs a signal for adjusting a frequency to the frequency setting devices 20a and 20b for the hard wire and for the soft wire respectively, in accordance with the polarity ratio set by a dial, and outputs at the same time a signal for determining a straight polarity arc period $T_{EN}$ to a ratio gain 28. At this moment, the polarity ratio γ is assumed to be γ=($I_{EN} \times T_{EN}$)/($I_P \times T_P + I_{EN} \times T_{EN}$), as the base current $I_B$ and the base current period $T_B$ can be ignored, which do not much influence the melt and the blend of the wire. Then, since the pulse current $I_P$, the pulse width $T_P$, the straight polarity current $I_{EN}$ and the polarity ratio γ are set respectively, a single value of the straight polarity arc period $T_{EN}$ can be determined.

Figure 6:
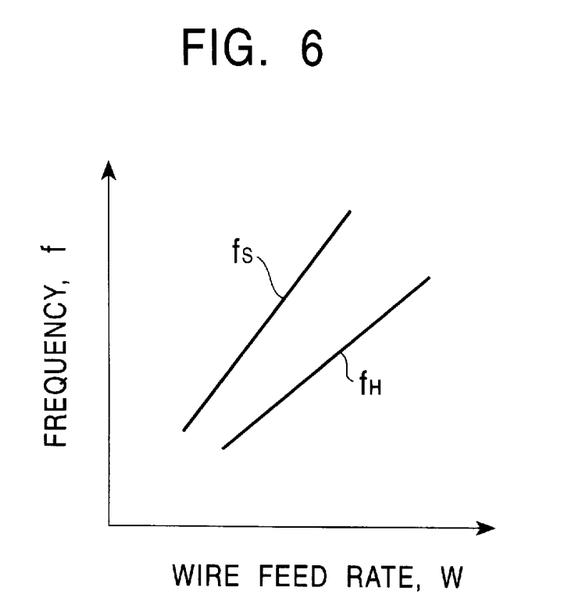
FIG. 6 is a graph showing frequencies $f_H$, $f_s$, to be set by a wire feed rate, at a time of using the hard wire or the soft wire, with the frequency as the ordinate, and the feed rate as the abscissa.
Figure 7:
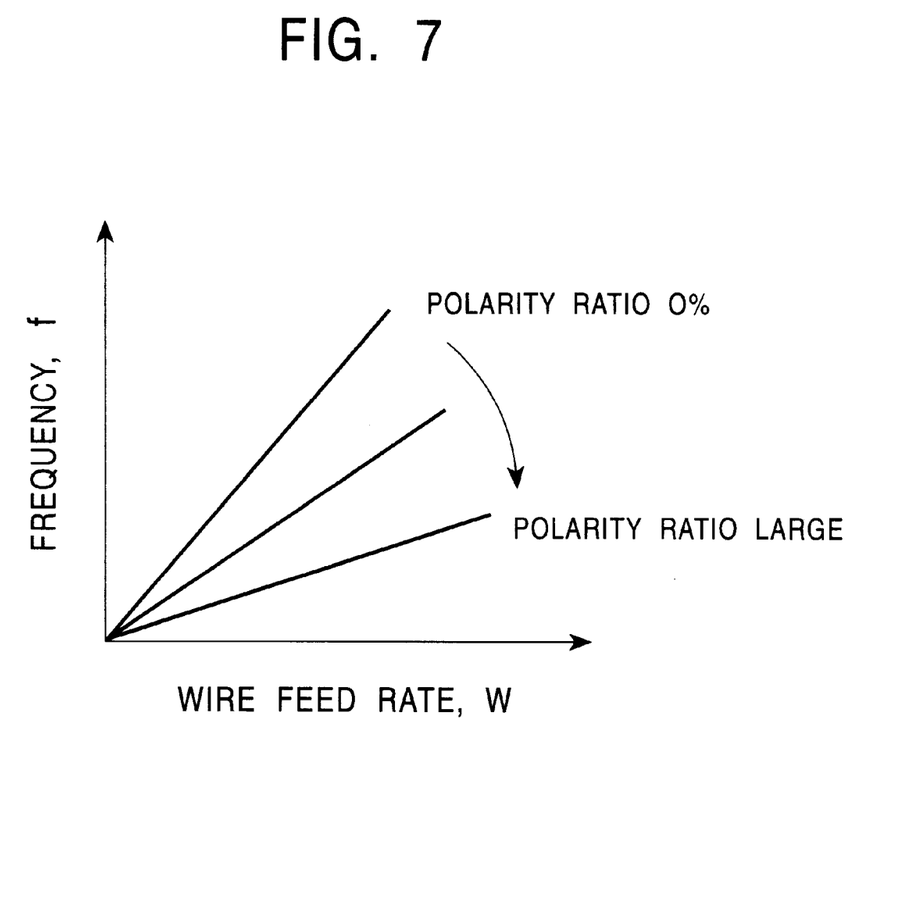
FIG. 7 is a graph showing a relationship of a frequency to be adjusted by a polarity ratio and a wire feed rate, with the frequency as the ordinate, and the a wire feed rate as the abscissa.

Further, the frequency setting device 20a for the hard wire and the frequency setting device 20b for the soft wire set, for example, as shown in FIG. 6, the frequency $f_H$ for the hard wire and the frequency $f_s$ for the soft wire, in accordance with the wire feed rate W and the material of the wire (the hard wire or the soft wire). At the same time, the frequency setting device 20a for the hard wire and the frequency setting device 20b for the softwire adjust the ratios of the frequencies $f_H$, $f_s$ and the wire feed rate W ($f_H$/W, $f_s$/W), in accordance with a signal from the polarity ratio setting device 19. That is, as shown in FIG. 7, in correspondence with the polarity ratio, the relationship between the wire feed rate and the frequency f will be changed.

The ratio gain 28 adjusts a signal output from the polarity ratio setting device 19, based on a signal from the pulse width setting circuit, and then outputs to the straight polarity arc period setting circuit 18. In case of switching corresponding to the type of wire, the pulse width $T_P$ will change. Then, by this ratio gain 28, the straight polarity arc period $T_{EN}$ is adjusted, as the ratio $T_P/T_{EN}$ of the pulse width $T_P$ and the straight polarity arc period $T_{EN}$ should be a constant. Then, the straight polarity arc period setting circuit 18 sets the straight polarity arc period $T_{EN}$ based on a signal from the ratio gain 28, and outputs a set value to the pulse waveform selection circuit 24.

An error amplifier 22 inputs a value set in the voltage setting device 21 and a voltage detected value output from the voltage detector 11, and outputs a signal to the adder 23, to trim a frequency set in the frequency setting circuit 20 such that these two values should match. The adder 23 adds an output of the error amplifier 22 to a frequency setting signal output from the frequency setting circuit 20, and trims the frequency setting signal.

The base current period setting circuit 17 determines, as a frequency setting signal from the adder 23, the pulse width $T_{PH}$, $T_{PS}$ setting signals from the pulse width setting circuit 16, and the straight polarity arc period $T_{EN}$ setting signal from the straight polarity arc period setting circuit 18 being input, the base current period $T_B$, from the relationships of the frequency f=1/T and T=T+$T_{EN}$+$T_B$, and then outputs this value to the pulse waveform selection circuit 24.

The pulse waveform selection circuit 24 selects any one of the set signals of the pulse current $I_P$, the base current $I_B$ or the straight polarity current $I_{EN}$, based on the outputs of the pulse current setting circuit 13, the base current setting circuit 14, the straight polarity current setting circuit 15, the pulse width setting circuit 16, the base current period setting circuit 17, and the straight polarity arc period setting circuit 18. Then the selected value is outputted to the error amplifier 25 as the current set value. Also, from this pulse waveform selection circuit 24, a current selection signal which indicates what kind of a current setting signal is being outputted is output to the polarity conversion control circuit 27.

The error amplifier 25 compares the current value detected by the current detector 12 and the current set value. The output control circuit 26 controls, based on the output of this error amplifier 25, the primary (the first) inverter 4 such that the current value flowing through the current detector 12 turns to be a current value corresponding to the pulse current $I_P$, the base current $I_B$ or the straight polarity current $I_{en}$.

The polarity conversion control circuit 27 to which the current selection signal is input from the pulse waveform selection circuit 24, outputs a signal which drives the secondary inverter 8, such that it turns to be an inverse characteristic when the pulse current $I_P$ or the base current $I_B$ is being selected, i.e., such that the wire side turns to be plus, and the workpiece side turns to be minus.

Next, a method for welding, by using the consumable electrode type AC pulse arc welding apparatus as configured above, will be described. At first, prior to welding, by the wire feed rate setting device 32, a feeding amount of the wire 9 is set. Also, a voltage value is set by the voltage setting device 21, as well as a straight polarity ratio is set by the polarity ratio setting device 19. Further, in accordance with the wire type to be used (for example, the hard wire), the switch SW1 for switching a wire type is set to be an open state, for example.

When starting a welding, the wire 9 is fed toward the workpiece 10 with a predetermined rate, as well as an AC pulse, for example, as shown in FIG. 2 (a)–(c) being applied, between the wire 9 and the workpiece 10. In the straight polarity arc period $T_{EN}$ of this AC pulse, a droplet grows at the wire tip. Then, the droplet transfers to a molten pond on the workpiece 10 side in the pulse width $T_{PH}$, $T_{PS}$ or the base current period $T_B$ which follows thereto. Also, during the base current period $T_B$, a maintenance of the arc and a few growings of a droplet are implemented. Then, in the next straight polarity arc period $T_{EN}$, the droplet would not transfer, and again the droplet will grow at the wire tip. As described above, with one pulse one droplet surely transfers to the workpiece 10, by synchronizing with one period of the AC pulse.

Next, when welding, for example, with the soft wire, by changing the wire to be used, the switch SW1 for switching the wire type is made to be in a closed state. Accordingly, within the pulse width setting circuit 16 and the frequency setting circuit 20, the switch SW2 for switching the pulse width setting device and the switch SW3 for switching the frequency setting device are switched from the hard wire side (H) to the soft wire side (S). At this moment, although the set value of the pulse width $T_P$ output from the pulse width setting circuit would change, based on a signal from the pulse width setting circuit 16, the ratio gain 28 outputs a signal which determines the straight polarity arc period $T_{EN}$ such that $T_P/T_{EN}$ would turn to be a constant, to the straight polarity arc period setting device 18. By doing so, even when the wire to be used is changed to the soft wire, the welding is implemented in the similar fashion as for the case of using the hard wire.

In the present embodiment, in accordance with the material of the wire, the pulse width setting device 16*a* for the hard wire or the pulse width setting device 16*b* for the soft wire is selected. Since the pulse width $T_{PH}$ for the hard wire or the pulse width $T_{PS}$ for the soft wire is selected within these setting devices, a trimming of a feed amount of energy to the wire can be made possible, and in accordance with the material of the wire, a transfer of one droplet to the workpiece with one pulse can be implemented.

Further, in the present embodiment, in accordance with the material of the wire, the frequency setting device 20*a* for the hard wire or the frequency setting device 20*b* for the soft wire is selected. Since the frequency $f_H$ for the hard wire or the frequency $f_S$ for the soft wire is selected within these setting devices, an average current value can be changed. Therefore, in accordance with the material of the wire, an amount of energy supply to the wire can be changed greatly. As a result of this, a molten amount of the workpiece can be properly adjusted.

Moreover, as shown in the present embodiment, by having the ratio gain 28 which changes the straight polarity arc period $T_{EN}$, between the ratio setting device 19 and the straight polarity arc period setting circuit 18, even if the pulse width $T_P$ is changed when switching a selection of the wire type, because of the $T_{EN}$ being so adjusted that the $T_P/T_{EN}$ would turn to be a constant by the ratio gain 28, the polarity ratio γ turns to be a constant. Therefore, because a welding penetration depth would be equal comparing with that before switching, the finish of welding can be predicted, whereby the welding workability can be enhanced much more. Further, in the apparatus of the present invention, since this ratio gain 28 is not required absolutely, it might be arranged to output a signal from the ratio setting device 19 directly to the straight polarity arc period setting circuit 18.

As described above, in the present embodiment, in accordance with the material of the wire, because the most suitable pulse width $T_P$ and the frequency f can be selected, disregarding the type of wire, an excellent bead appearance and welding workability can be obtained. Also, by switching only the pulse width $T_P$ and the frequency f, it can be adapted to wires made of various types of materials, whereby the circuit configuration can be simplified.

Further, in the present invention, the portions of the control circuit except the pulse width setting circuit and the frequency setting circuit of the control circuit as well as the portion of the power circuit for obtaining the AC output are not limited to the configurations as described above. For example, in the present embodiment, although the pulse current setting circuit 13 sets the pulse current $I_P$, by a signal from the wire feed rate setting device 32, this pulse current setting circuit 13 is not required to be connected to the wire feed rate setting device 32. That is, in the pulse current setting circuit 13, it may be possible that a pulse current $I_P$ that satisfies an energy level suitable for one pulse-one droplet transfer which is determined by the diameter of the wire and the shield gas and the like, could be set.

As described above, according to the present invention, in accordance with the material of the wire, because a more suitable pulse width and frequency for a switching means can be selected, disregarding the type of wire, an excellent bead appearance and welding workability can be obtained. Also, by switching only a pulse width and a frequency, it can be adapted to wires made of various types of materials, whereby the welding apparatus can be configured with a simple circuit.

Further, when the apparatus of the present invention switches from the selection of a first wire side to the selection of a second wire side of the pulse width setting device and the frequency setting device, it has means for changing an energize period $T_{EN}$ of the straight polarity arc such that an energize ratio would turn to be a constant. Because a value of γ might not be changed by switching the selection the finish of a welding such as a welding penetration depth and the like can be predicted. Accordingly, the efficiency of the welding workability can be enhanced much more.

What is claimed is:

1. A consumable electrode type AC pulse arc welding apparatus for alternatingly and with a predetermined frequency supplying a reverse polarity arc current constituted from a base current for maintaining an arc and a pulse current for transferring a droplet to a workpiece, and a straight polarity arc current to which a current value is set based on a wire feed rate, comprising:

a first pulse width setting device for a first wire and a second pulse width setting device for a second wire for setting widths of pulse currents of reverse polarity arc currents;

a first pulse frequency setting device for a first wire and a second pulse frequency setting device for a second wire for setting frequencies of said pulse currents of said reverse polarity arc currents, respectively; and switching means for switching selection between said first pulse width setting device and said second pulse width setting device simultaneously with switching selection between said first pulse frequency setting device and said second pulse frequency setting device, respectively.

2. A consumable electrode type AC pulse arc welding apparatus according to claim 1, further comprising a polarity ratio setting device for adjusting frequency setting values of said first pulse frequency setting device and said second pulse frequency setting device, and for determining a straight polarity arc period $T_{EN}$, such that a polarity ratio $\gamma=(I_{EN} \times T_{EN})/(I_P \times T_P + I_{EN} \times T_{EN})$ set at a predetermined value determines a base current $I_B$ of said reverse polarity arc, a period $T_B$, a pulse current $I_P$ and a pulse width $T_P$, said straight polarity arc current being $I_{EN}$, and a period thereof being $T_{EN}$.

3. A consumable electrode type AC pulse arc welding apparatus according to claim 2, wherein said straight polarity arc current $I_{EN}$ and said pulse current $I_P$, are set based on said wire feed rate.

4. A consumable electrode type AC pulse arc welding apparatus according to claim 3, wherein said straight polarity arc current $I_{EN}$ and said pulse current $I_P$ are set based only on the wire feed rate.

5. A consumable electrode type AC pulse arc welding apparatus according to claim 1, further comprising a ratio gain for changing a straight polarity arc period $T_{EN}$ such that a ratio $T_P/T_{EN}$ of a pulse width $T_P$, and said straight polarity arc period $T_{EN}$ is a constant when switching selection between said first pulse width setting device and said second pulse width setting device and selection between said first pulse frequency setting device and said second pulse frequency setting device.

6. A consumable electrode type AC pulse arc welding apparatus according to claim 1, wherein said first pulse width setting device and said second pulse width setting device are formed to set the pulse widths based on said wire feed rate.

7. A consumable electrode type AC pulse arc welding apparatus according to claim 1, wherein said first pulse frequency setting device and said second pulse frequency setting device are formed to set the frequencies based on said wire feed rate.

8. A consumable electrode type AC pulse arc welding apparatus according to claim 1, wherein said first pulse width setting device and said second pulse width setting device are formed to set the pulse widths based on said wire feed rate, and said first pulse frequency setting device and said second pulse frequency setting device are formed to set the frequencies based on said wire feed rate.

* * * * *